(12) United States Patent
Tas et al.

(10) Patent No.: US 10,990,678 B2
(45) Date of Patent: Apr. 27, 2021

(54) METHOD TO PROTECT APPLICATION RUNNING IN A HOSTILE ENVIRONMENT

(71) Applicant: Comodo Security Solutions, Inc., Clifton, NJ (US)

(72) Inventors: Egemen Tas, North Bergen, NJ (US); Haibo Zhang, Beijing (CN)

(*) Notice: Subject to any disclaimer, the term of this patent is extended or adjusted under 35 U.S.C. 154(b) by 118 days.

(21) Appl. No.: 16/044,509

(22) Filed: Jul. 25, 2018

(65) Prior Publication Data

US 2019/0114424 A1 Apr. 18, 2019

Related U.S. Application Data

(60) Provisional application No. 62/537,416, filed on Jul. 26, 2017.

(51) Int. Cl.
*G06F 21/00* (2013.01)
*G06F 21/56* (2013.01)

(52) U.S. Cl.
CPC .......... *G06F 21/566* (2013.01); *G06F 21/561* (2013.01); *G06F 2221/033* (2013.01)

(58) Field of Classification Search
CPC . G06F 21/561; G06F 21/566; G06F 2221/033
See application file for complete search history.

(56) References Cited

U.S. PATENT DOCUMENTS

| 8,370,931 | B1* | 2/2013 | Chien | G06F 21/566 709/224 |
| 2015/0101049 | A1* | 4/2015 | Lukacs | H04L 63/14 726/23 |
| 2018/0218153 | A1* | 8/2018 | Edwards | G06F 21/566 |

* cited by examiner

*Primary Examiner* — Beemnet W Dada
*Assistant Examiner* — Ka Shan Choy
(74) *Attorney, Agent, or Firm* — Joseph P. Aiena

(57) ABSTRACT

There is provided a method to protect applications running in a hostile environment, including against trampoline based attacks which use dll injection and code modification. The method includes protecting an application when access is performed from injected dll, and protecting the application when access is performed from modified codes.

2 Claims, 8 Drawing Sheets

Access from Injected DLL

Access from Injected DLL

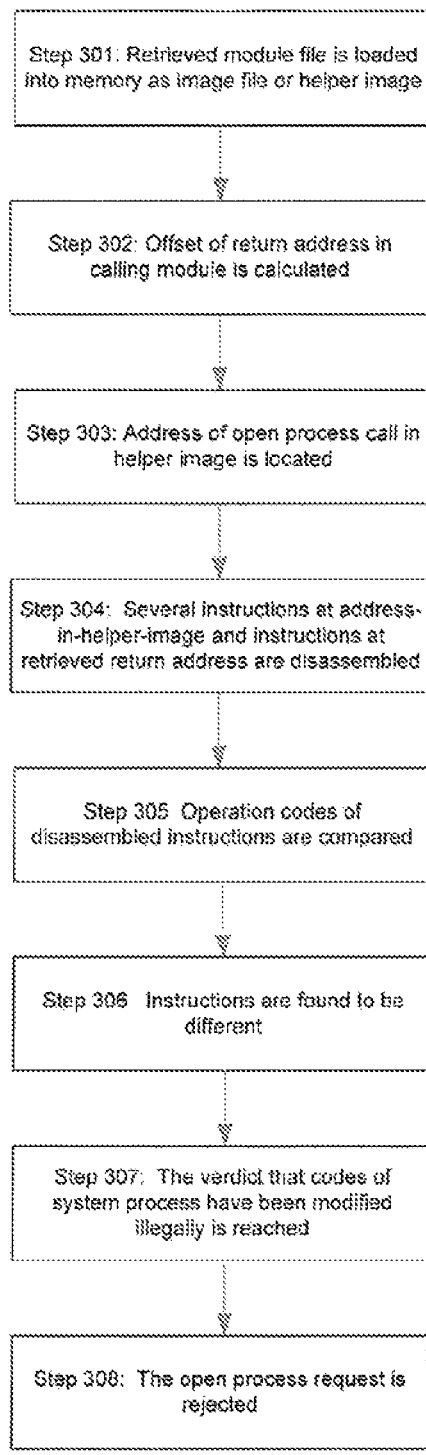

Access from Modified Codes

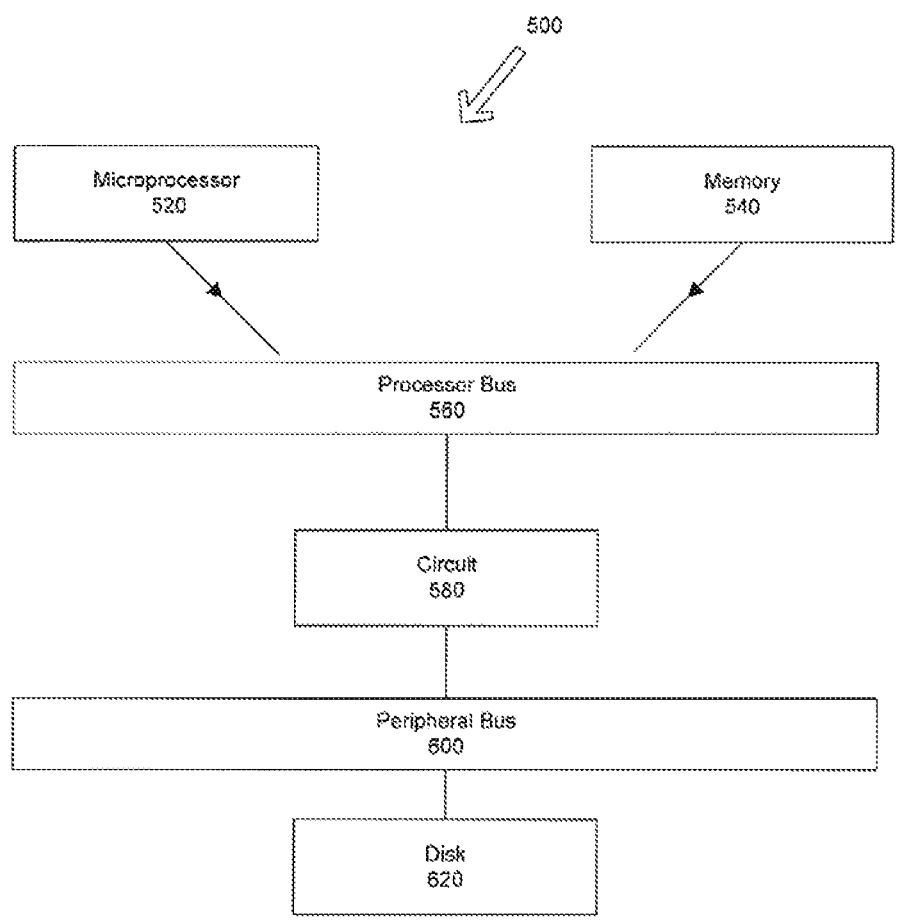

METHOD TO PROTECT APPLICATION RUNNING IN A HOSTILE ENVIRONMENT

CROSS REFERENCE TO RELATED APPLICATIONS

This Application claims priority from U.S. Provisional Application No. 62/537,416 filed on Jul. 26, 2017, which is incorporated herein by reference in its entirety.

BACKGROUND

In a hostile environment one of the most widely used way for malware to get access to protected application is to open target process with read/write access, then read its private data in memory, modify its data/codes or launch threads.

Since some system processes running as system components (e.g. svchost.exe) need to access protected application as well for some basic application features like privilege management and skin painting, it is necessary for protection suite to distinguish accesses from legal application and malicious ones.

Traditional way is to set up callbacks to intercept all requests to open process, check if they are from legal process by verifying process context of intercepted calls.

However nowadays attackers are becoming smarter. They can make use of legal system process as a trampoline to perform attacks in a "legal" context. Since the dll resides in context of system process, traditional solution cannot detect it.

Thus there is a need in new method that would provide an efficient solution to defense applications against indirect attacks and to differ accesses from legal application and malicious applications.

SUMMARY OF INVENTION

The current invention is a method and system to protect applications running in hostile environment. The present invention is based on the idea to find the real caller that tries to open protected application.

New method guarantees defense against new trampoline based attacks which use dll injection and codes modification.

BRIEF DESCRIPTION OF DRAWINGS

FIG. 3a is a flowchart of another embodiment of the invention where algorithm to defense application when access is performed from modified codes is shown.

FIG. 4 illustrates a system of a computer or device.

DETAILED DESCRIPTION

The present invention discloses a method and system to defense applications against indirect attacks which make use of system process (e.g. svchost.exe) as a trampoline.

Figure 1:
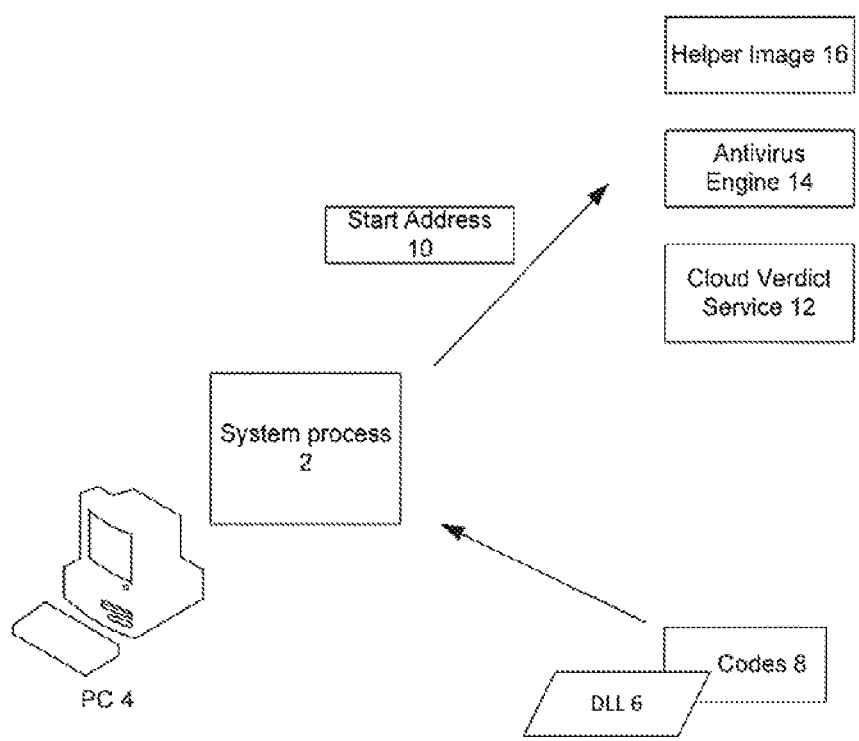
FIG. 1 shows the general scheme and components of the invention.

FIG. 1 shows the general scheme and components of the invention. Here the system process 2 is run on computer device 4. A dll 6 (dynamically loaded module) with codes 8 to execute is injected into system process 2. Dll 6 and codes 8 can be either malicious or legal. To find out that start address 10 or codes 8 of the dll 6 are analyzed in cloud verdict service 12, antivirus engine 14 or helper image 16.

Figure 2A:
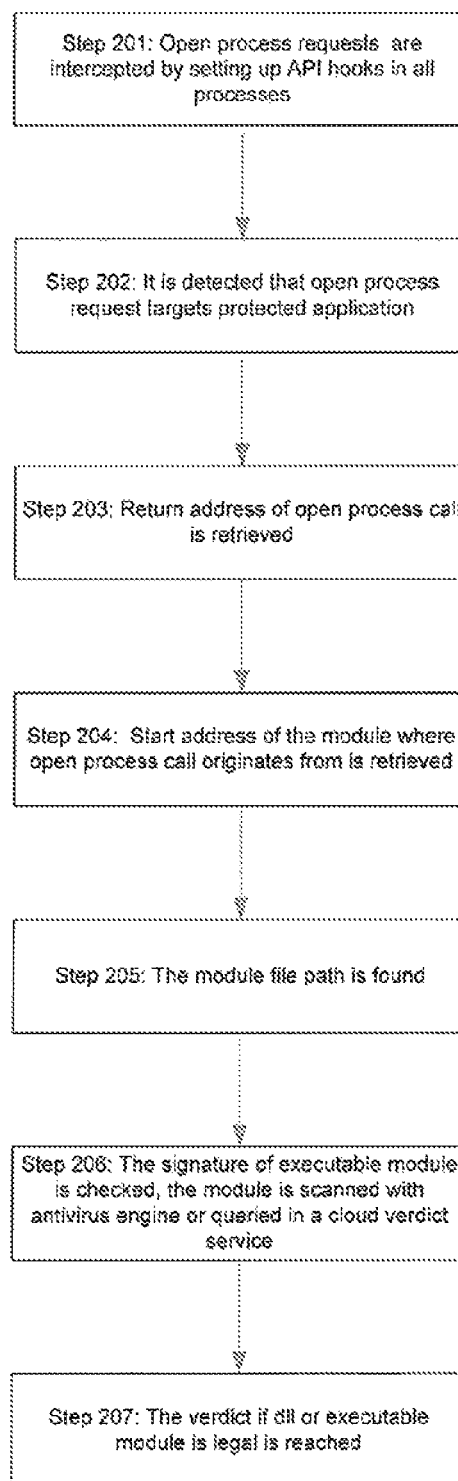
FIG. 2a is a flowchart of one embodiment of the invention where algorithm to defense application when access is performed from injected dll is shown.
Figure 2B:
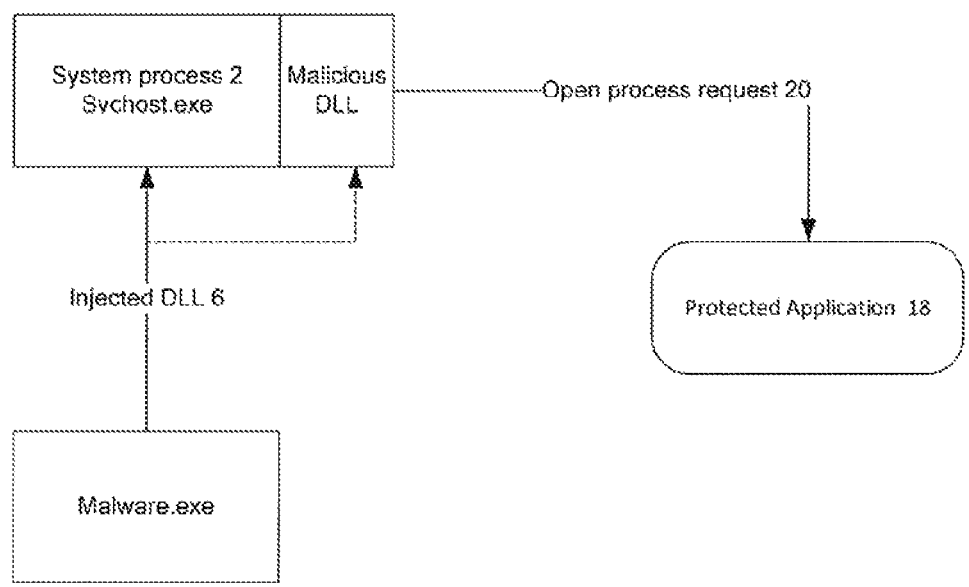
FIG. 2b is a depiction of one embodiment of the invention where algorithm to defense application when access is performed from injected dll is shown.

FIGS. 2a and 2b are flowchart and depiction of one embodiment of the invention where algorithm to defense application 18 when access is performed from injected dll 6 is shown. In step 201 open process requests 20 (NtOpenProcess and OpenProcess in Windows systems) are intercepted by setting up API hooks in all processes 2. In step 202 it is detected that open process request 20 targets protected application 18. In step 203 the return address 22 of open process call 20 is retrieved. In step 204 the start address 10 of the module where open process call 20 originates from (VirtualQueryEx in Windows system) is retrieved. The module file path 24 (GetModuleFileName in Windows system) is found, step 205. In step 206 the signature of executable module is checked, the module is scanned with antivirus engine 14 or queried in a cloud verdict service 12. In step 207 the verdict if dll 6 or executable module is legal is reached.

Figure 3B:
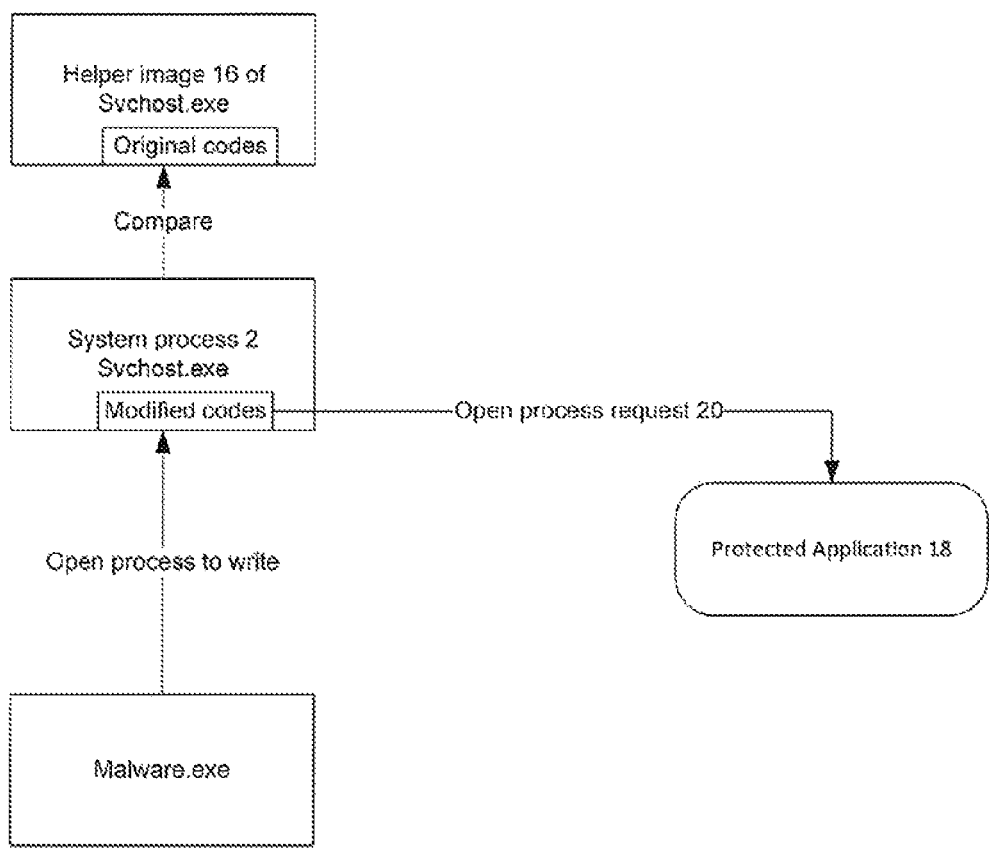
FIG. 3b is a depiction of another embodiment of the invention where algorithm to defense application when access is performed from modified codes is shown.

FIGS. 3a and 3b are flowchart and depiction of another embodiment of the invention where algorithm to defense application 18 when access is performed from modified codes 8 is shown. Here attacker injects codes 8 to system process 2 directly without introducing new module, so the only path of system process image is returned and it cannot be used to identify this attack. Thus another algorithm is applied. In step 301 retrieved module file is loaded into memory as image file (CreateFileMapping in Windows system), which relocates instructions properly. Let us name it helper image 16. In step 302 offset of return address 22 in calling module is calculated. In step 303 address of open process call 20 in helper image 16 is located. Let us name it address-in-helper-image 26 (start address of helper image+offset retrieved). In step 304 several instructions (e.g. five instructions) at address-in-helper-image 26 and instructions at retrieved return address 22 are disassembled. In step 305 operation codes 8 of disassembled instructions are compared. Operands should be ignored as they may be different because of instruction relocation. In step 306 instructions are found to be different. In step 307 the verdict that codes 8 of system process 2 have been modified illegally is reached. In step 308 the open process request 20 is rejected.

Figure 5:
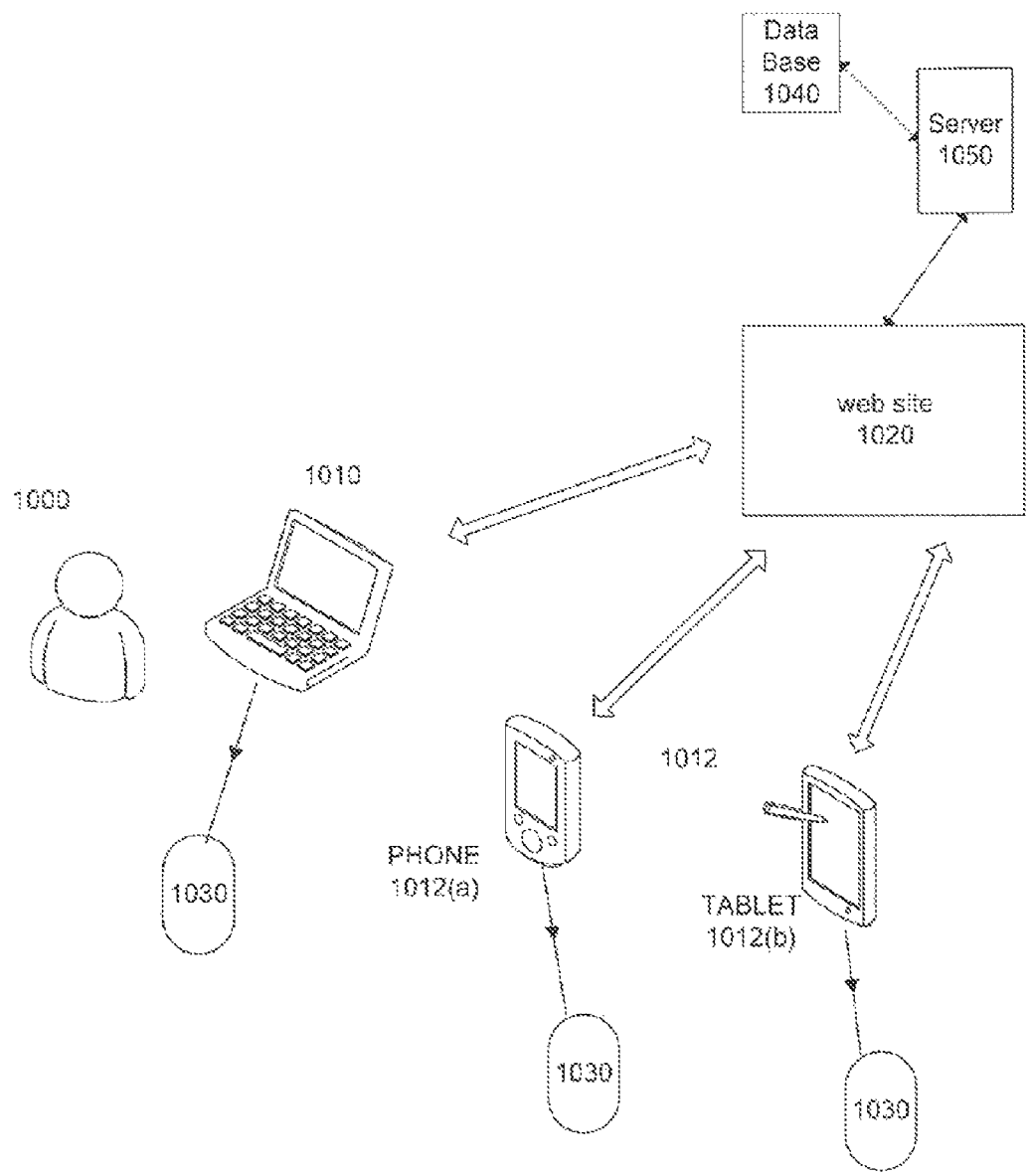
FIG. 5 is a schematic of an individual user operating a computer or handheld device connected to the internet.

The system and method of the present invention may be used with computer systems and devices as shown in FIGS. 4 and 5. FIG. 4 illustrates a system 500 of a computer or device which includes a microprocessor 520 and a memory 540 which are coupled to a processor bus 560 which is coupled to a peripheral bus 600 by circuitry 580. The bus 600 is communicatively coupled to a disk 620. It should be understood that any number of additional peripheral devices are communicatively coupled to the peripheral bus 600 in embodiments of the invention. Further, the processor bus 560, the circuitry 580 and the peripheral bus 600 compose a bus system for computing system 500 in various embodiments of the invention. The microprocessor 520 starts disk access commands to access the disk 620. Commands are passed through the processor bus 560 via the circuitry 580 to the peripheral bus 600 which initiates the disk access commands to the disk 620. In various embodiments of the invention, the present system intercepts the disk access commands which are to be passed to the hard disk.

As shown generally by FIG. 5, there is a user 1000 of a computer 1010 or handheld device 1012 who accesses an Internet website 1020 with network connections to a server 1050 and database 1040. The computer 1010 or handheld device is compatible with operating systems known in the art, such as Windows, iOS or android devices or android type operating systems. The user 1000 may connect via the internet to many website servers and transmit data via connections to a website server. The user 1000 requires for the transmission of sensitive and private data a secure connection and therefore may utilize a public and private key as embodied in a PKI system for encrypting data and prevent the interception or review of any data and information transferred between the user and website server due to lack of data encryption. Those of skill in the art would recognize that the computer 1010 or hand held devices 1012a or 1012b each has a processor and a memory coupled with the processor where the memory is configured to provide the processor with executable instructions. A boot disk 1030 is present for initiating an operating system as well for each of the computer 1010 or hand held devices 1012. It should also be noted that as used herein, the term handheld device includes phones, smart phones, tablets, personal digital assistants, media and game players and the like. It should also be understood that the user's computer or device may be part of an internal network or system which is communicating with the Internet. As used throughout the specifications, the term "query" or "queries" is used in the broadest manner to include requests, polls, calls, summons, queries, and like terms known to those of skill in the art.

Figure 6:
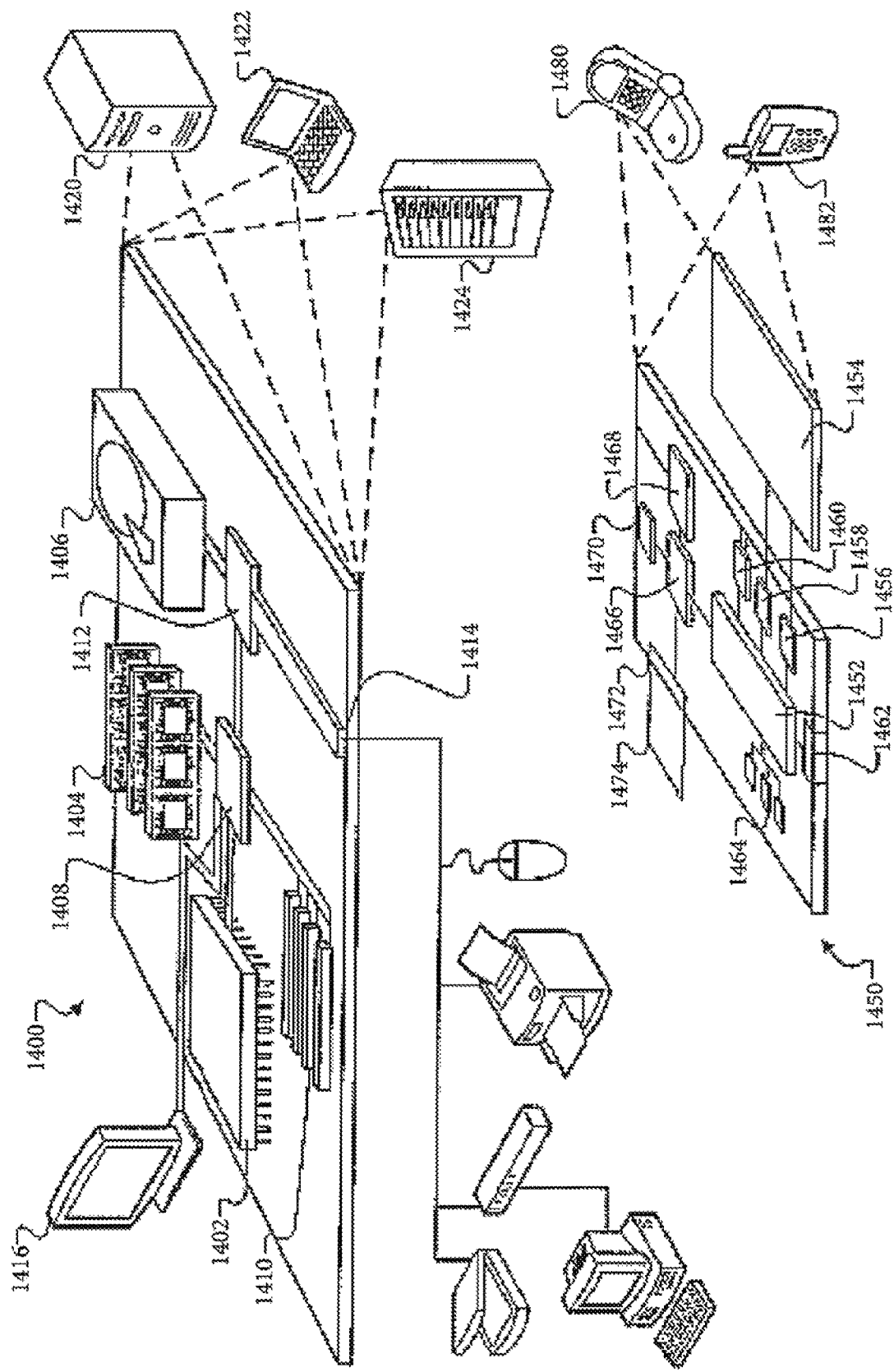
FIG. 6 is a schematic of the memory and hardware of a computer or handheld device, such as a tablet or smartphone for implementing the present invention.

FIG. 6 shows an example of a generic computer device 1400 and a generic mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, and an input/output device such as a display 1454, a communication interface 1466, and a transceiver 1468, among other components. The device 1450 may also be provided with a storage device, such as a Microdrive or other device, to provide additional storage. Each of the components 1450, 1452, 1464, 1454, 1466, and 1468 are interconnected using various busses, and several of the components may be mounted on a common motherboard or in can execute instructions within the computing device including instruction store in the other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with and utilize an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

As would be understood in the art, the computer, the processor, microprocessor, controller, control unit or other programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" or "microcontroller" constitute hardware in the claimed disclosure that contain circuitry that is configured for operation with software or firmware, and may be construed as implicitly including Digital Signal Processor (DSP) hardware.

The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

Elements of different implementations described herein may be combined to form other implementations not specifically set forth above. Elements may be left out of the processes, computer programs, or method steps described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method to defend against trampoline based attacks which use dynamic link library (dll) injection and code modification comprising:
   protecting an application when access is performed from injected dll, and protecting said application when access is performed from modified codes, where said application is protected when said access is performed from said injected dll, by
   intercepting open process requests by setting up API hooks in all processes,
   obtaining return address of the open process call if an open process request targets protected application,
   obtaining start address of the module from where said open process call originates,
   obtaining module file path and determine if said module file path is a legal dll or executable module by checking signature, scanning with antivirus engine or querying in a cloud verdict service.

2. A method to defend against trampoline based attacks which use dynamic link library (dll) injection and code modification comprising:
   protecting an application when access is performed from injected dll, and protecting said application when access is performed from modified codes, where the application is protected when said access is performed from said modified codes, by
   loading module file into memory as image file or helper image, which relocates instructions properly,
   calculating offset of return address in calling module,
   locating address of open process call in helper image and calling said address address-in-helper-image,
   disassembling several instructions at said address-in-helper-image and instructions at return address,
   comparing operation codes of said disassembled instructions, and
   rejecting open process request if instructions are different, as meaning that codes of system process have been modified illegally.

* * * * *